US011206582B2

(12) United States Patent
Manepalli et al.

(10) Patent No.: US 11,206,582 B2
(45) Date of Patent: Dec. 21, 2021

(54) FAST RETURN TO WI-FI

(71) Applicant: Apple Inc., Cupertino, CA (US)

(72) Inventors: Venkateswara Rao Manepalli, Cupertino, CA (US); Paul V. Flynn, Cupertino, CA (US); Artiom Shamis, Cupertino, CA (US); Thanigaivelu Elangovan, Cupertino, CA (US); Vijay Venkataraman, Cupertino, CA (US); Ajoy K. Singh, Cupertino, CA (US); Veerendra Boodannavar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 15/593,686

(22) Filed: May 12, 2017

(65) Prior Publication Data

US 2018/0332506 A1 Nov. 15, 2018

(51) Int. Cl.
H04W 36/00 (2009.01)
H04W 84/12 (2009.01)
H04W 88/06 (2009.01)
H04W 48/16 (2009.01)

(52) U.S. Cl.
CPC ........ H04W 36/0022 (2013.01); H04W 48/16 (2013.01); H04W 84/12 (2013.01); H04W 88/06 (2013.01)

(58) Field of Classification Search
CPC ......... H04W 36/0022; H04W 36/4816; H04W 84/12; H04W 88/06; H04W 48/16; Y02D 30/70
See application file for complete search history.

(56) References Cited

U.S. PATENT DOCUMENTS

| 7,729,489 B2 * | 6/2010 | Lee ................... H04M 3/42263 379/201.1 |
| 8,380,203 B1 * | 2/2013 | Semersky ........... H04W 36/023 455/437 |
| 8,699,456 B2 * | 4/2014 | Smadi .................. H04W 36/08 370/331 |

(Continued)

FOREIGN PATENT DOCUMENTS

WO WO-2017116246 A1 * 7/2017 ......... H04L 65/4061

Primary Examiner — Asad M Nawaz
Assistant Examiner — Kai Chang
(74) Attorney, Agent, or Firm — Sterne, Kessler, Goldstein & Fox P.L.L.C.

(57) ABSTRACT

Embodiments for performing a fast return to Wi-Fi following completion of a cellular voice call are provided. These embodiments include detecting that a device has switched from communicating over a Wi-Fi interface to communicating over a cellular interface; determining the earliest time that the device can switch back to Wi-Fi; and instituting the switch. In some embodiments, the process of performing a fast return to Wi-Fi is carried out by devices having small form factors, such as smartwatches and other wearables, which may be susceptible to coexistence and peak power problems. The fast return to Wi-Fi embodiments disclosed herein allow a device to perform a voice call over a cellular interface when Wi-Fi calling is not available, and switch over to a Wi-Fi interface immediately upon completion of the voice call in order to conserve battery life, achieve higher data speeds, and avoid high costs associated with cellular data transmissions.

24 Claims, 4 Drawing Sheets

(56) References Cited

U.S. PATENT DOCUMENTS

| | | | | |
|---|---|---|---|---|
| 8,874,069 B1* | 10/2014 | Zhao | H04W 4/90 | 455/404.1 |
| 9,210,625 B1* | 12/2015 | Lovlekar | H04W 36/0066 | |
| 9,756,571 B2* | 9/2017 | Chandra | H04W 52/028 | |
| 2004/0121772 A1* | 6/2004 | Rue | H04L 63/08 | 455/436 |
| 2007/0263828 A1* | 11/2007 | Lee | H04M 3/42263 | 379/212.01 |
| 2008/0014956 A1* | 1/2008 | Balasubramanian | H04L 41/0806 | 455/452.1 |
| 2008/0062958 A1* | 3/2008 | Jonsson | H04L 41/00 | 370/350 |
| 2008/0151845 A1* | 6/2008 | Jaakkola | H04W 8/005 | 370/338 |
| 2010/0316155 A1* | 12/2010 | Reinhold | H04B 7/04 | 375/267 |
| 2011/0105179 A1* | 5/2011 | Tanabe | H04M 1/72533 | 455/556.1 |
| 2011/0222466 A1* | 9/2011 | Pance | H04Q 3/0029 | 370/316 |
| 2011/0299422 A1* | 12/2011 | Kim | H04W 48/16 | 370/253 |
| 2012/0224481 A1* | 9/2012 | Babiarz | H04L 41/5022 | 370/230.1 |
| 2012/0230304 A1* | 9/2012 | Barbu | H04W 48/18 | 370/338 |
| 2012/0250657 A1* | 10/2012 | Zhou | H04W 36/0038 | 370/331 |
| 2013/0272269 A1* | 10/2013 | Srivastava | H04W 36/30 | 370/332 |
| 2014/0105181 A1* | 4/2014 | Milam | H04L 65/1069 | 370/332 |
| 2014/0372551 A1* | 12/2014 | Fleck | H04W 72/04 | 709/213 |
| 2015/0055455 A1* | 2/2015 | Campbell | H04W 48/06 | 370/230 |
| 2015/0094071 A1* | 4/2015 | Hang | H04W 76/19 | 455/450 |
| 2015/0163734 A1* | 6/2015 | Park | H04W 12/12 | 370/338 |
| 2015/0237537 A1* | 8/2015 | Stimpson | H04W 36/0011 | 370/331 |
| 2016/0029189 A1* | 1/2016 | Michael | H04W 4/16 | 455/417 |
| 2016/0183162 A1* | 6/2016 | Jeong | H04W 12/003 | 370/311 |
| 2016/0227446 A1* | 8/2016 | Rodzevski | H04B 13/005 | |
| 2016/0234749 A1* | 8/2016 | Singh | H04W 36/0022 | |
| 2016/0373984 A1* | 12/2016 | Hara | H04W 36/0085 | |
| 2017/0054840 A1* | 2/2017 | Kobayashi | H04B 1/385 | |
| 2017/0064063 A1* | 3/2017 | Watanabe | H04M 1/7253 | |
| 2017/0105222 A1* | 4/2017 | Nieman | H04W 76/14 | |
| 2017/0135014 A1* | 5/2017 | Li | H04W 36/18 | |
| 2017/0332294 A1* | 11/2017 | Miyagoshi | H04W 36/36 | |
| 2018/0160362 A1* | 6/2018 | Raghunathan | H04W 48/16 | |
| 2018/0176841 A1* | 6/2018 | Sankaranarayan | H04W 36/14 | |
| 2018/0176975 A1* | 6/2018 | Peng | H04W 88/06 | |
| 2018/0234900 A1* | 8/2018 | Sankaranarayan | H04W 76/30 | |
| 2018/0255611 A1* | 9/2018 | Li | H04W 4/70 | |
| 2021/0076213 A1* | 3/2021 | Pandey | H04L 9/3226 | |

* cited by examiner

FAST RETURN TO WI-FI

FIELD

This disclosure generally relates to wireless communications, and more specifically to performing a fast return to Wi-Fi following the completion of a cellular voice call.

BACKGROUND

Related Art

Consumer electronic devices have become an important part of people's everyday lives. These electronic devices include everything from cellphones, laptops, tablets and smartwatches to televisions, digital assistants and other home appliances. More recently, many consumer electronic devices have been adapted to include wireless communication capabilities, such that these devices can communicate and coordinate with one another, as well as with wireless access points and cellular base stations. For example, with the increasingly widespread availability and use of wirelessly-enabled electronic devices, individuals may now be able to perform tasks, such as make phone calls, stream music and video, and browse the internet all from the individuals' personal wirelessly-enabled devices.

While the ever increasing capabilities of these wirelessly-enabled devices bring about exciting new opportunities, these advancements also introduce certain challenges, such as coexistence and peak power problems. Both the coexistence problem and the peak power problem steam from a wirelessly-enabled device attempting to transmit or receive voice and/or data over different interfaces—e.g., cellular and Wi-Fi—at the same time. Specifically, coexistence generally occurs when a wirelessly-enabled device attempts to concurrently transmit or receive different signals from different antennas (e.g., cellular and Wi-Fi antennas) that are in close proximity to each other. This generally results in interference of one, or both, of the signals. Conversely, the peak power problem generally refers to the scenario where a wirelessly-enabled device cannot generate enough power to reach the level of output power that is needed to properly transmit two different signals (e.g., voice and data signals) at the same time. This generally results in distortion of the signals, and/or physical damage to the integrated circuits within the wirelessly-enabled device.

The coexistence and peak power problems become exacerbated as the wirelessly-enabled devices take on smaller and smaller form factors. Such devices are unable to: (i) create the separation between their antennas that is needed to generate sufficient isolation between the transmitted signals; and (ii) generate sufficient levels of power to properly transmit the signals without experiencing distortion or physical damage to the integrated circuits. As such, these coexistence and peak power problems are particularly prevalent in small form factor devices, such as smartwatches and other wearables.

SUMMARY

The present disclosure provides system, apparatus, method, and computer program product embodiments, and combinations and sub-combinations thereof, for performing a fast return to Wi-Fi following the completion of a cellular voice call.

In some embodiments, performing a fast return to Wi-Fi may include: detecting that a wirelessly-enabled device has switched from communicating over a Wi-Fi interface to communicating over a cellular interface; determining the earliest possible instance that the device can switch back to the Wi-Fi interface; and instituting the switch back to Wi-Fi. In some embodiments, the process of performing a fast return to Wi-Fi is intended to be carried out by wirelessly-enabled devices having small form factors, such as smartwatches and other wearables, which may be particularly susceptible to the coexistence and peak power problems associated with concurrently transmitting voice and/or data signals over different interfaces (e.g., cellular and Wi-Fi). However, the process of performing a fast return to Wi-Fi is equally applicable to any device, having two or more wireless interfaces, that is unable to generate a sufficient separation between its antennas, or sufficient levels of power to properly transmit the desired signals.

The fast return to Wi-Fi techniques disclosed herein are advantageous because, for example, they allow a wirelessly-enabled device to: (i) perform a voice call over a cellular interface when the device is not within a Wi-Fi coverage area, or when the device does not support Wi-Fi calling; and (ii) switch over to a Wi-Fi interface immediately upon completion of the voice call in order to conserve battery life, achieve higher data speeds, and avoid the relatively high costs associated with cellular data transmissions.

Although the embodiments disclosed herein are discussed in the context of switching between a Wi-Fi interface and a cellular interface, this disclosure is not so limited. Instead, the wireless interface switching techniques disclosed herein may be equally applicable to several other types of wireless technologies, such as, without limitation, Bluetooth, radio-frequency identification (RFID), near field communications (NFC), and 60 GHz communications, as well as several different types of wireless communication devices.

In some embodiments, the process of performing a fast return to Wi-Fi following the completion of a cellular voice call disclosed herein may include initiating a communication session from a small form factor wirelessly-enabled device, such as a smartwatch, using a Wi-Fi interface. The Wi-Fi communication session may include the transmission or reception of data packets corresponding to an action taken on the wirelessly-enabled device including, for example, streaming music or video, or browsing the internet. Subsequently, the wirelessly-enabled device may be prompted to switch its mode of communication from the Wi-Fi interface to a cellular voice interface. The switch from Wi-Fi to cellular may be triggered by several different events, such as the desire to make or receive a voice call. In such instances, the switch from Wi-Fi to cellular may be required when the wirelessly-enabled device is not within a Wi-Fi coverage area, or when the device does not support Wi-Fi calling, for example.

Following the completion of the cellular communication session, it may be advantageous to relatively quickly switch the mode of communication back from the cellular interface to the Wi-Fi interface. For example, the wirelessly-enabled device may benefit from such a switch for several reasons, including to conserve battery life, to achieve higher data speeds, and/or to avoid the relatively high costs associated with cellular data transmissions. Therefore, if the wirelessly-enabled device disassociates with a wireless access point (thereby causing the Wi-Fi interface to go down) during the course of the cellular communication session, then certain techniques may be implemented to ensure the fast return to Wi-Fi.

In an instance where the Wi-Fi interface does go down (e.g., where wirelessly-enabled device 110 is no longer able to communicate with its destination point through the Wi-Fi interface), the wirelessly-enabled device may then immediately scan its surrounding environment for the presence of a wireless access point to which the device can associate with. If the wirelessly-enabled device is able to associate with an access point, then the device switches its mode of communication back from the cellular interface to the Wi-Fi interface to facilitate future data communications. If, however, the wirelessly-enabled device is unable to find an access point or is unable to associate with an access point, then the device may instead use a cellular data interface—such as but not limited to an internet Packet Data Network (PDN) interface over cellular—to facilitate future data communications. In the event where the wirelessly-enabled device facilitates future data communications using the cellular data interface, the device may continue to scan its surrounding environment at periodic intervals so as to facilitate a switch back to Wi-Fi when an available wireless access point is detected.

Thus, the communication mode switching embodiments disclosed herein facilitate the fast return to Wi-Fi (when Wi-Fi is available) following the completion of a cellular voice call or any other activity that invokes the cellular interface, thereby conserving battery life, achieving higher data speeds, and avoiding the relatively high costs associated with cellular data transmissions.

BRIEF DESCRIPTION OF THE DRAWINGS/FIGURES

Embodiments of the disclosure are described with reference to the accompanying drawings. In the drawings, generally, like reference numbers indicate identical or functionally similar elements. Additionally, generally, the left most digit(s) of a reference number identifies the drawing in which the reference number first appears.

DETAILED DESCRIPTION

Figure 1:
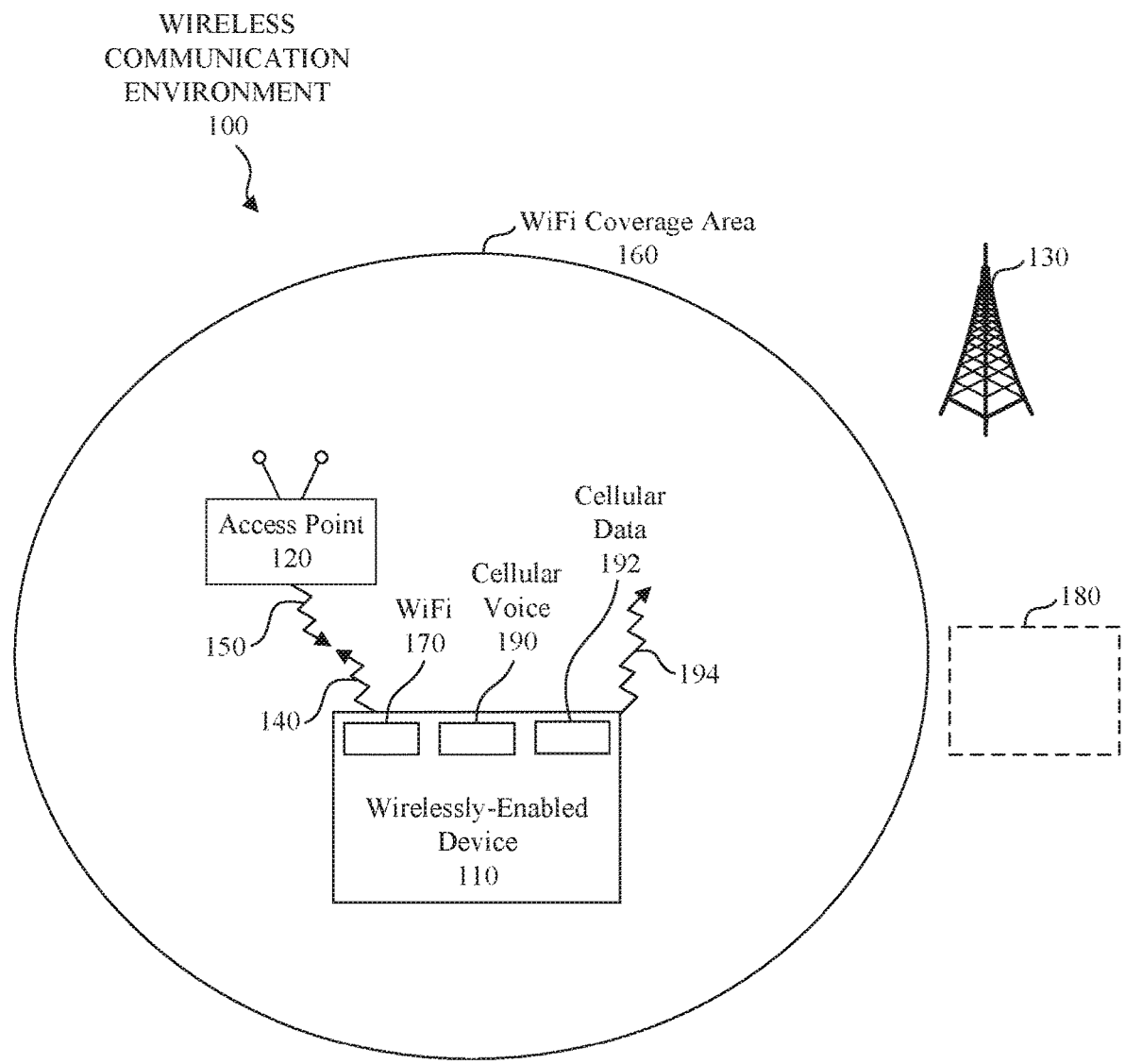
FIG. 1 illustrates a block diagram of a wireless communication environment, according to some embodiments.

FIG. 1 illustrates a block diagram of a wireless communication environment according to some embodiments. A wireless communication environment 100 provides wireless communication of information, such as one or more commands and/or data, between a wirelessly-enabled device 110, an access point 120, and a base station 130. Those skilled in the relevant art(s) will recognize that wirelessly-enabled device 110 may be configured to communicate using any one of Wi-Fi, Bluetooth, radio-frequency identification (RFID), near field communications (NFC), 60 GHz communications, cellular communication, or the like. Additionally, in some embodiments, wirelessly-enabled device 110 may be implemented as small form factor device, such as a smartwatch or other wearable. Alternatively, wirelessly-enabled device 110 may be implemented as a standalone or a discrete device or may be incorporated within or coupled to another electrical device or host device, such as a cellphone, portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player, and could also be implemented as a key fob, or a household appliance, to provide some examples and/or any other suitable electronic device that will be apparent to those skilled in the relevant art(s) without departing from the spirit and scope of the present disclosure.

In an embodiment, wirelessly-enabled device 110 may be configured to transmit a first wireless signal 140) toward access point 120 using any acceptable modulation scheme. Access point 120 may be configured to receive first wireless signal 140, process signal 140 and, if necessary, transmit a second wireless signal 150 back to wirelessly-enabled device 110. In this manner, wirelessly-enabled device 110 and access point 120 exchange information ("communicate") with one another. The signals exchanged between wirelessly-enabled device 110 and access point 120 may represent any number of different signals types, including: scanning signals (e.g., "beacons"), command signals, or data packets, to provide some examples.

In an embodiment, access point 120 may represent an exemplary embodiment of a Wi-Fi access point, and may have a Wi-Fi coverage area 160 associated therewith. Wi-Fi coverage area 160 may represent a distance (or range) from access point 120, within which Wi-Fi connectivity via access point 120 may be possible.

Additionally, wirelessly-enabled device 110 may be mobile, and thus may be capable of moving in and out of Wi-Fi coverage area 160. When wirelessly-enabled device 110 is located within Wi-Fi coverage area 160, then wirelessly-enabled device 110 may be configured to communicate with access point 120 using a Wi-Fi interface 170. Using Wi-Fi interface 170, wirelessly-enabled device 110 may transmit or receive data packets corresponding to various actions including, for example, streaming music or video, or browsing the internet, via access point 120.

Conversely, when wirelessly-enabled device 110 is located outside of Wi-Fi coverage area 160, then wirelessly-enabled device 110 may no longer be capable of obtaining Wi-Fi connectivity through access point 120. Thus, when wirelessly-enabled device 110 moves outside of Wi-Fi coverage area 160, for example to location 180, wirelessly-enabled device 110 may switch its mode of communication from Wi-Fi to cellular. In such instances, wirelessly-enabled device 110 may then communicate with base station 130 using a cellular voice interface 190 or a cellular data interface 192. For example, wirelessly-enabled device 110 may be configured to transmit a third wireless signal 194 toward base station 130 using any acceptable modulation scheme. Third wireless signal 194 may represent any number of different signals types, including: command signals, voice signals, or data packets, to provide some examples.

In practice, there may be several reasons for causing wirelessly-enabled device 110 to switch its mode of communication from Wi-Fi to cellular beyond the scenario where wirelessly-enabled device 110 is located outside of Wi-Fi coverage area 160. For example, wirelessly-enabled device 110 could be located within Wi-Fi coverage area 160, but the Wi-Fi connectivity may be unreliable or unsecure, or wirelessly-enabled device 110 may not support a particular communication type using Wi-Fi, such as failing to support Wi-Fi calling. In each of these instances, and others that will be appreciated by persons skilled in the relevant art(s), wirelessly-enabled device 110 may need to switch its mode of communication from Wi-Fi to cellular.

The switch from Wi-Fi to cellular may be required because some wirelessly-enabled devices suffer from coexistence and/or peak power problems when those devices attempt to transmit or receive voice and/or data over different interfaces—e.g., cellular and Wi-Fi—at the same time. The coexistence and peak power problems become exacerbated as these wirelessly-enabled devices take on smaller and smaller form factors, as such devices are usually unable to create the separation between their antennas that is needed to generate sufficient isolation between the communicated signals. As such, these coexistence and peak power problems are particularly prevalent in smartwatches and other wearables. Therefore, it may be particularly advantageous to prevent small form factor devices, such as smartwatches, from being able to concurrently transmit voice and/or data over different interfaces.

Therefore, given the desire to prevent wirelessly-enabled device 110 from concurrently transmitting over both its Wi-Fi and cellular interfaces (e.g., coexistence problems), or concurrently transmitting voice and data over its cellular voice interface 190 and cellular data interface 192 (e.g., peak power problems), it would be useful then to develop a solution for switching between the two modes of communication as quickly as possible such that wirelessly-enabled device 110 is able to achieve improved or even optimal battery life, data speed, reliability, and operational costs. In some embodiments, to ensure that these problematic concurrent transmissions are avoided, when a voice call is active over cellular voice interface 190, an indication may be sent from wirelessly-enabled device 110's baseband processor (discussed in FIG. 4 below) to the wireless subsystem (discussed in FIG. 4 below) to disallow the transmission or receipt of data over Wi-Fi interface 170. The indication may be sent from the baseband processor to the wireless subsystem using any applicable interface, such as wirelessly-enabled device 110's wireless coexistence interface, to provide an example.

As will be apparent to those skilled in the relevant art(s) from the disclosure herein, improved battery life, data speed, reliability, and operational costs may be achieved by ensuring the fast return to Wi-Fi following the completion of a cellular communication session (e.g., a cellular voice call).

In an illustrative example, wirelessly-enabled device 110 may start out being located within Wi-Fi coverage area 160, and may be actively engaged in a Wi-Fi communication session. In an embodiment, Wi-Fi coverage area 160 may represent a home Wi-Fi network, a public Wi-Fi network at a coffee shop, or the like. During this Wi-Fi communication session, wirelessly-enabled device 110 may transmit and receive data packets from access point 120. In some embodiments, the successful communication of data packets between wirelessly-enabled device 110 and access point 120 may be referred to as wirelessly-enabled device 110 being associated with access point 120. These data packets may correspond to an ongoing action taken by a user of wirelessly-enabled device 110, such as streaming music or video, or browsing the internet. Subsequently, the Wi-Fi communication session may be interrupted by an event such as an incoming voice call. In an embodiment, wirelessly-enabled device 110 may not support Wi-Fi calling, or may be located in an area that does not allow for Wi-Fi calling, and therefore may switch communication modes from Wi-Fi to cellular in order to facilitate the incoming voice call. In some embodiments, a switch from Wi-Fi to cellular may be evident to a user of wirelessly-enabled device 110 when an application that is running on wirelessly-enabled device 110, and that is currently transmitting or receiving data packets over Wi-Fi, becomes interrupted.

During the cellular communication session, wirelessly-enabled device 110 may become disassociated with access point 120. This disassociation could be caused by a number of factors, including the cellular communication session lasting for too long of a time period, or access point 120 making an unsuccessful attempt to transmit data to wirelessly-enabled device 110. If wirelessly-enabled device 110 does not become disassociated with access point 120 during the cellular communication session, for example if there is no data pending transmission at access point 120, then wirelessly-enabled device 110's internet protocol ("IP") address may be retained, and Wi-Fi interface 170 may remain active throughout the cellular communication session. In such instances, a re-association process is not needed, and wirelessly-enabled device 110 may switch back to Wi-Fi interface 170 immediately following the conclusion of the cellular communication session (e.g., cellular voice call). However, when wirelessly-enabled device 110 does become disassociated with access point 120, this may lead to Wi-Fi interface 170 going down. This may also result in wirelessly-enabled device 110 being unable to engage in a Wi-Fi communication session even after the cellular communication session has ended.

In some embodiments, when Wi-Fi interface 170 does go down (e.g., where wirelessly-enabled device 110 is no longer able to communicate with its destination point through the Wi-Fi interface) during the cellular communication session, Wi-Fi interface 170 should be brought back up (e.g., put into a state where wirelessly-enabled device 110 can communicate with its destination point through the Wi-Fi interface) immediately following the conclusion of the cellular communication session. Indeed, bringing Wi-Fi interface 170 back up immediately after the cellular communication session has ended will allow wirelessly-enabled device 110 to perform a fast return to Wi-Fi, thereby helping conserve battery life, achieve higher data speeds, and avoid the relatively high costs associated with cellular data transmissions. To bring Wi-Fi interface 170 back up, wirelessly-enabled device 110 may scan wireless communication environment 100 for the presence of a wireless access point to which wirelessly-enabled device 110 can associate with. If wirelessly-enabled device 110 is located within Wi-Fi coverage area 160, then wirelessly-enabled device 110 may re-associate with access point 120, at which point, wirelessly-enabled device 110 can then switch back from cellular voice interface 190 to Wi-Fi interface 170. Subsequently, wirelessly-enabled device 110 can utilize Wi-Fi interface 170 to facilitate future data communications.

If, however, wirelessly-enabled device 110 is located outside of Wi-Fi coverage area 160, for example at location 180, then wirelessly-enabled device 110 may be unable to re-associate with access point 120. In such a scenario, wirelessly-enabled device 110 may instead have to use cellular data interface 192 to facilitate data communications. In the event where wirelessly-enabled device 110 is forced to use cellular data interface 192, wirelessly-enabled device 110 may continue to scan wireless communication environment 100 at periodic intervals so as to facilitate a switch back to Wi-Fi interface 170 as soon as an available wireless access point is detected.

Figure 2:
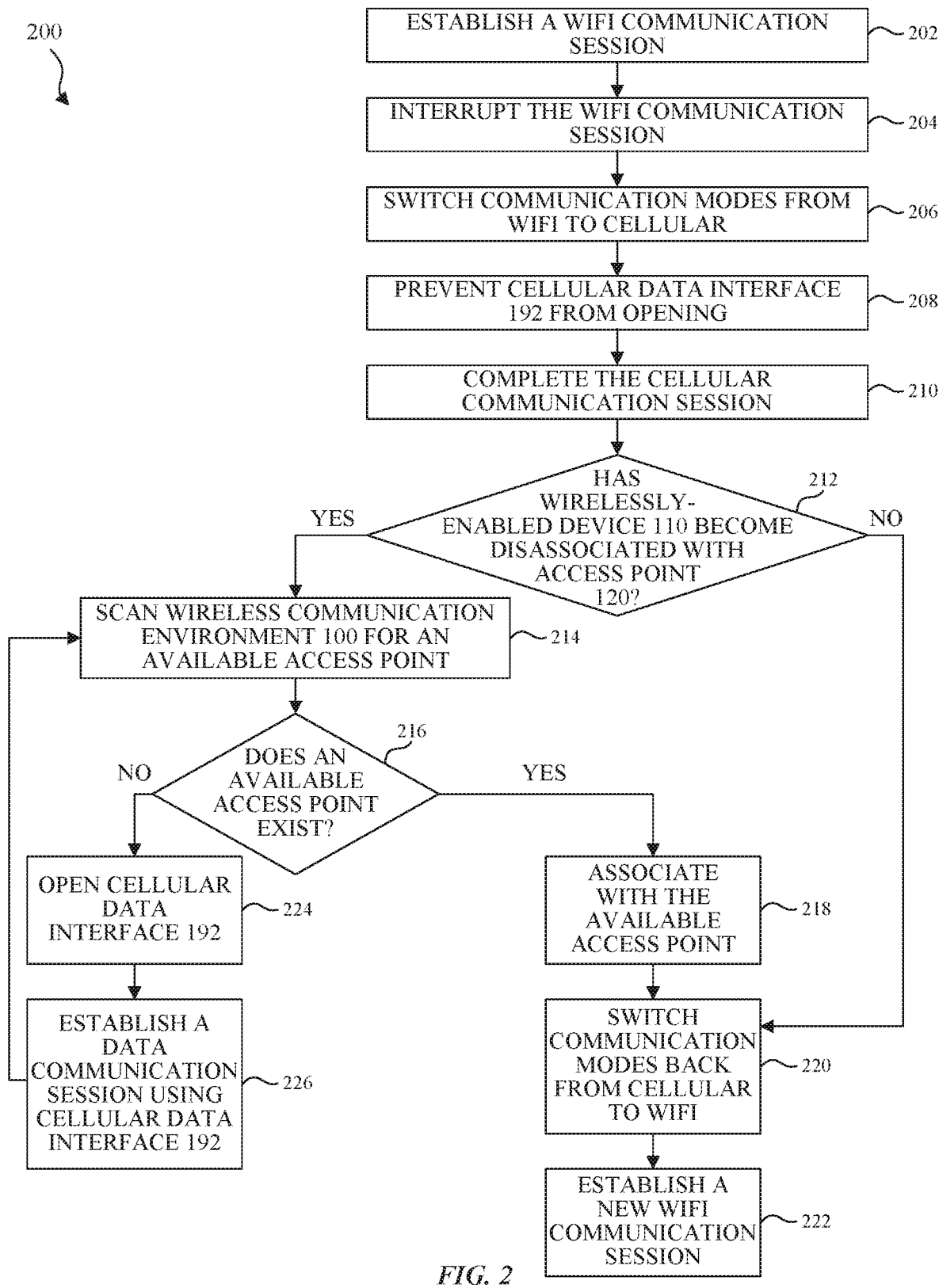
FIG. 2 is a flowchart of exemplary operational steps of performing a fast return to Wi-Fi following the completion of a cellular voice call, according to some embodiments.

FIG. 2 is a flowchart or method 200 of exemplary operational steps of performing a fast return to Wi-Fi following the completion of a cellular voice call according some embodiments. This disclosure is not limited to this operational description. Rather, it will be apparent to persons skilled in the relevant art(s) from the teachings herein that other operational control flows are within the spirit and scope of the present disclosure. The following discussion describes the steps in FIG. 2. For illustrative purposes, the flowchart 200 of FIG. 2 is described with reference to embodiments of FIG. 1. However, flowchart 200 is not limited to these embodiments.

The method 200 begins with operation 202, where wirelessly-enabled device 110 establishes a Wi-Fi communication session. The Wi-Fi communication session may involve wirelessly-enabled device 110 transmitting and/or receiving data packets from access point 120. Through the successful communication of these data packets, wirelessly-enabled device 110 may become associated with access point 120. These communicated data packets may correspond to an ongoing action taken by a user of wirelessly-enabled device 110, such as streaming music or video, browsing the internet, or any other action that can be facilitated using Wi-Fi.

In operation 204, the Wi-Fi communication session may be interrupted by an event that is not supported by Wi-Fi. In an embodiment, this interrupting event may represent an incoming voice call if wirelessly-enabled device 110 does not support Wi-Fi calling. However, other interrupting events may also be possible without departing from the spirit and scope of the present disclosure. For example, wirelessly-enabled device 110 traveling outside of Wi-Fi coverage area 160 represents another possible event that may interrupt the ongoing Wi-Fi communication session.

In operation 206, wirelessly-enabled device 110 switches communication modes from Wi-Fi to cellular. For example, in the scenario where the interrupting event is an incoming voice call (and wirelessly-enabled device 110 does not support Wi-Fi calling), wirelessly-enabled device 110 may bring up cellular voice interface 190 (e.g., put into a state where wirelessly-enabled device 110 can communicate with its destination point through cellular voice interface 190) in order to facilitate the incoming voice call. As discussed previously herein, a switch from Wi-Fi interface 170 to cellular voice interface 190 does not necessarily result in Wi-Fi interface 170 being brought down (e.g., does not necessarily result in wirelessly-enabled device 110 becoming disassociated with access point 120). However, in instances where Wi-Fi interface 170 does go down, this may be an indication that cellular data interface 192—e.g., an internet PDN interface-should be opened (e.g., put into a state where wirelessly-enabled device 110 can communicate with on its destination point through this interface) in order to compensate for the lack of Wi-Fi connectivity. However, as discussed previously herein, allowing concurrent transmissions of voice signals over cellular voice interface 190 and data signals over cellular data interface 192 can result in peak power problems, and thus should be avoided.

Therefore, in operation 208, wirelessly-enabled device 110 prevents cellular data interface 192 from opening up, even in the scenario where Wi-Fi interface 170 goes down.

In an embodiment, Wi-Fi interface 170 may also periodically query cellular voice interface 190 during the cellular communication session to determine whether the cellular communication session has been completed yet.

In any event, in operation 210 wirelessly-enabled device 110 completes the cellular communication session (e.g., cellular voice call). In an embodiment, the cellular voice call may be completed by the user of wirelessly-enabled device 110 ending the call, by the calling party) ending the call, or by the call being dropped due to some other connectivity issue.

In operation 212, a determination is made as to whether wirelessly-enabled device 110 has become disassociated with access point 120 during the course of the cellular communication session. When wirelessly-enabled device 110 becomes disassociated with access point 120, this generally leads to Wi-Fi interface 170 going down, which can result in wirelessly-enabled device 110 being unable to engage in a Wi-Fi communication session even after the cellular communication session has ended. In an embodiment, a disassociating of wirelessly-enabled device 110 may be signaled by a disassociate message being received at wirelessly-enabled device 110 from access point 120. Additionally or alternatively, the disassociation may be detected locally by wirelessly-enabled device 110 detecting that Wi-Fi interface 170 is down. Disassociation may be caused by a number of factors, including but not limited to, the cellular communication session lasting for too long of a time period, too many devices being located within the vicinity of access point 120, or access point 120 making an unsuccessful attempt to transmit data to wirelessly-enabled device 110 during the cellular communication session.

If it is determined in operation 212 that wirelessly-enabled device 110 has become disassociated with access point 120, then the operational control flow proceeds to operation 214. In operation 214, wirelessly-enabled device 110 scans wireless communication environment 100 for the presence of a wireless access point to which wirelessly-enabled device 110 can associate with. In an embodiment, wirelessly-enabled device 110 (e.g., a baseband processor of wirelessly-enabled device 110) may actively bring down cellular voice interface 190 following the completion of the cellular communication session. Actively bringing down cellular voice interface 190 may then prompt an immediate scan of wireless communication environment 100.

In operation 216, another determination is made as to whether an available access point exists for wirelessly-enabled device 110 to associate with. In an embodiment, wirelessly-enabled device 110 may be given a predetermined amount of time to complete its scan and re-associate, or create a new association, with an available access point. If wirelessly-enabled device 110 is unable to locate and associate with an access point in that predetermined amount of time, then the operational control flow will proceed directly to operation 224. Therefore, wirelessly-enabled device 110 is given a chance to reestablish a Wi-Fi communication session before allowing data transmissions to occur over cellular data interface 192. In an embodiment, the predetermined amount of time for wirelessly-enabled device 110 to locate and associate with an access point may be in the range of approximately one to 10 seconds.

If it is determined in operation 216 that an available access point does exist, then the operational control flow proceeds to operation 218. In operation 218, wirelessly-enabled device 110 re-associates with the access point (if wirelessly-enabled device 110 had a previous communication session with the access point), or creates a new association with the access point (if wirelessly-enabled device 110 did not have a previous communication session with the access point). Wirelessly-enabled device 110 may be configured to re-associate, or create a new association, with an available access point by exchanging various command signals with the access point, and ultimately being assigned an IP address. Once wirelessly-enabled device 110 re-associates, or creates a new association, with an available access point, wirelessly-enabled device 110 can then bring back up Wi-Fi interface 170.

In operation 220, wirelessly-enabled device 110 switches back from cellular voice interface 190 to Wi-Fi interface 170.

In operation 222, wirelessly-enabled device 110 utilizes Wi-Fi interface 170 to facilitate future data communications.

If, however, it is determined in operation 216 that an available access point does not exist, then the operational control flow proceeds to operation 224. In operation 224, cellular data interface 192 is opened (as it was previously prevented from opening during the cellular communication session) in order to compensate for wirelessly-enabled device 110's inability to reopen Wi-Fi interface 170.

In operation 226, cellular data interface 192 may then be used to facilitate future data communications. In an embodiment, cellular data interface 192 may represent an internet PDN interface, however, other cellular data interfaces are also possible without departing from the spirit and scope of the present disclosure.

Following operation 226, the operational control flow returns to operation 214 where wirelessly-enabled device 110 may continue to scan wireless communication environment 100 at periodic intervals for the presence of an available access point to which wirelessly-enabled device 110 can associate with. These periodic scans will ultimately allow wirelessly-enabled device 110 to a switch back to Wi-Fi interface 170 as soon as an available wireless access point is detected.

If, however, it is determined in operation 212 that wirelessly-enabled device 110 did not disassociate with access point 120 during the cellular communication session, for example if there is no transmission data pending at access point 120, then the operational control flow proceeds to operation 220. When wirelessly-enabled device 110 does not disassociate with access point 120, wirelessly-enabled device 110's IP address may be retained, and Wi-Fi interface 170 may remain active throughout the cellular communication session. In such instances, a re-association, or creation of a new association, is not needed. Thus, the operation flow proceeds directly to operation 220 where wirelessly-enabled device 110 switches back to Wi-Fi interface 170 immediately following the conclusion of the cellular communication session (e.g., cellular voice call).

Method 200 therefore allows wirelessly-enabled device 110 to perform a fast return to Wi-Fi following the completion of a cellular voice call, thereby helping conserve battery life, achieve higher data speeds, and avoid the relatively high costs associated with cellular data transmissions.

Figure 3:
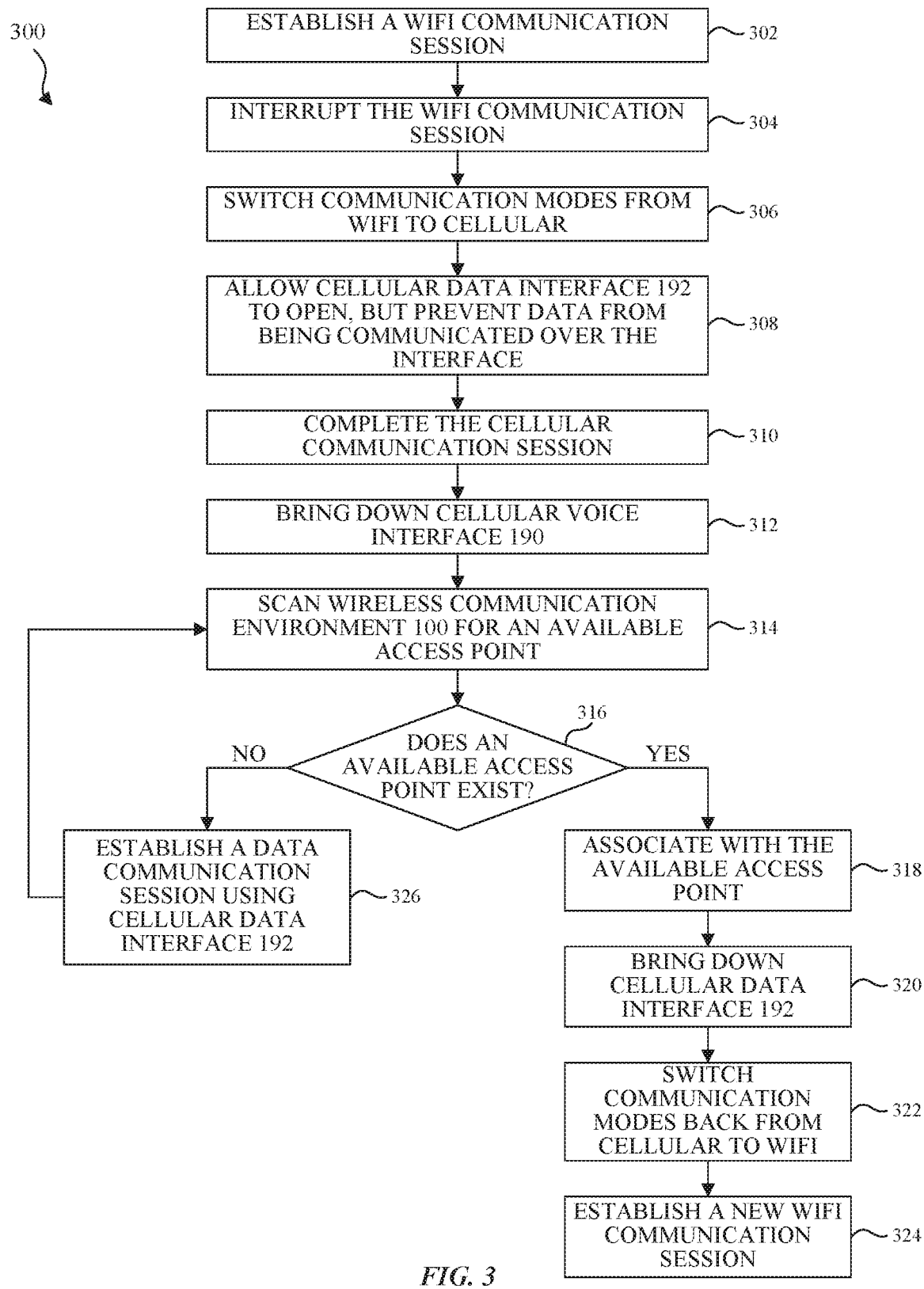
FIG. 3 is a flowchart of exemplary operational steps of performing a fast return to Wi-Fi following the completion of a cellular voice call, according to some embodiments.

FIG. 3 is a flowchart or method 300 of alternative exemplary operational steps of performing a fast return to Wi-Fi following the completion of a cellular voice call according to an exemplary embodiment of the present disclosure. The disclosure is not limited to this operational description. Rather, it will be apparent to persons skilled in the relevant art(s) from the teachings herein that other operational control flows are within the spirit and scope of the present disclosure. The following discussion describes the steps in FIG. 3. The flowchart 300 of FIG. 3 is described with reference to embodiments of FIG. 1. However, flowchart 300 is not limited to these embodiments.

Several of the operational control flows outlined in method 300 are similar to those discussed above in method 200. Therefore, an extensive discussion of the operational control flows that overlap between methods 200 and 300 will be omitted from the discussion here. Instead, reference will be made to the similar operational control flow in method 200, and the corresponding discussion from method 200 will apply equally to the discussion of the operational control flows in method 300.

The method 300 begins with operation 302, where wirelessly-enabled device 110 establishes a Wi-Fi communication session.

In operation 304, the Wi-Fi communication session may be interrupted by an event, such as an incoming voice call where wirelessly-enabled device 110 does not support Wi-Fi calling, or wirelessly-enabled device 110 traveling outside of Wi-Fi coverage area 160.

Operations 302 and 304 correspond to operations 202 and 204 from method 200. As such, the corresponding discussion of operations 202 and 204 (discussed above) apply equally to operations 302 and 304.

In operation 306, wirelessly-enabled device 110 switches communication modes from Wi-Fi to cellular. For example, in the scenario where the interrupting event is an incoming voice call (and wirelessly-enabled device 110 does not support Wi-Fi calling), wirelessly-enabled device 110 may bring up cellular voice interface 190 in order to facilitate the incoming voice call. As discussed previously herein, a switch from Wi-Fi interface 170 to cellular voice interface 190 does not necessarily result in Wi-Fi interface 170 being brought down (e.g., does not necessarily result in wirelessly-enabled device 110 becoming disassociated with access point 120). However, in instances where Wi-Fi interface 170 does go down, this may be an indication that cellular data interface 192—e.g., an internet PDN interface—should be opened up in order to compensate for the lack of Wi-Fi connectivity. However, as discussed previously herein, allowing concurrent transmissions of voice signals over cellular voice interface 190 and data signals over cellular data interface 192 can result in peak power problems, and thus should be avoided.

Therefore, in operation 308, cellular data interface 192 is allowed to open up, but wirelessly-enabled device 110 is configured to prevent any data from being transmitted or received over cellular data interface 192 during the cellular communication session. In some embodiments, wirelessly-enabled device 110's baseband processor, or application processor (discussed in FIG. 4 below), may be responsible for preventing data from being transmitted or received over cellular data interface 192.

In operation 310, wirelessly-enabled device 110 completes the cellular communication session (e.g., cellular voice call).

In operation 312, wirelessly-enabled device 110 may actively bring down cellular voice interface 190 following the completion of the cellular communication session. Actively bringing down cellular voice interface 190 may then prompt an immediate scan of wireless communication environment 100. In an embodiment, wirelessly-enabled device 110's baseband processor may be responsible for bring down cellular voice interface 190.

In operation 314, wirelessly-enabled device 110 scans wireless communication environment 100 for the presence of a wireless access point to which wirelessly-enabled device 110 can associate with.

In operation 316, a determination is made as to whether an available access point exists for wirelessly-enabled device 110 to associate with. In an embodiment, wirelessly-enabled device 110 may be given a predetermined amount of time to complete its scan and associate with an available access point. If wirelessly-enabled device 110 is unable to locate and associate with an access point in that predetermined amount of time, then the operational control flow will proceed directly to operation 326. Therefore, wirelessly-enabled device 110 is given a chance to reestablish a Wi-Fi communication session before allowing data transmissions to occur over cellular data interface 192.

If it is determined in operation 316 that an available access point does exist, then the operational control flow proceeds to operation 318. In operation 318, wirelessly-enabled device 110 re-associates with the access point (if wirelessly-enabled device 110 had a previous communication session with the access point), or creates a new association with the access point (if wirelessly-enabled device 110 did not have a previous communication session with the access point). Wirelessly-enabled device 110 may be configured to re-associate, or create a new association, with an available access point by exchanging various command signals with the access point, and ultimately being assigned an IP address. Once wirelessly-enabled device 110 re-associates, or creates a new association, with an available access point, wirelessly-enabled device 110 can then bring back up Wi-Fi interface 170.

In operation 320, wirelessly-enabled device 110 brings down cellular data interface 192—e.g., an internet PDN interface. In an embodiment, wirelessly-enabled device 110's baseband processor, or application processor, may be responsible for bring down cellular data interface 192.

In operation 322, wirelessly-enabled device 110 switches back from cellular voice interface 190 to Wi-Fi interface 170.

In operation 324, wirelessly-enabled device 110 utilizes Wi-Fi interface 170 to facilitate future data communications.

If, however, it is determined in operation 316 that an available access point does not exist within the set amount of time, then the operational control flow proceeds to operation 326. In operation 326, cellular data interface 192 may be kept opened, and data may then be allowed to be transmitted and received over cellular data interface 192. In an embodiment, wirelessly-enabled device 110's baseband processor, or application processor, may also be responsible for allowing data to begin to be transmitted or received over cellular data interface 192 after the set amount of time for associating with an access point expires.

Following operation 326, the operational control flow returns to operation 316 where wirelessly-enabled device 110 may continue to scan wireless communication environment 100 at periodic intervals for the presence of an available access point to which wirelessly-enabled device 110 can re-associate with. These periodic scans will ultimately allow wirelessly-enabled device 110 to a switch back to Wi-Fi interface 170 as soon as an available wireless access point is detected.

Method 300 therefore also allows wirelessly-enabled device 110 to perform a fast return to Wi-Fi following the completion of a cellular voice call, thereby helping conserve battery life, achieve higher data speeds, and avoid the relatively high costs associated with cellular data transmissions.

Figure 4:
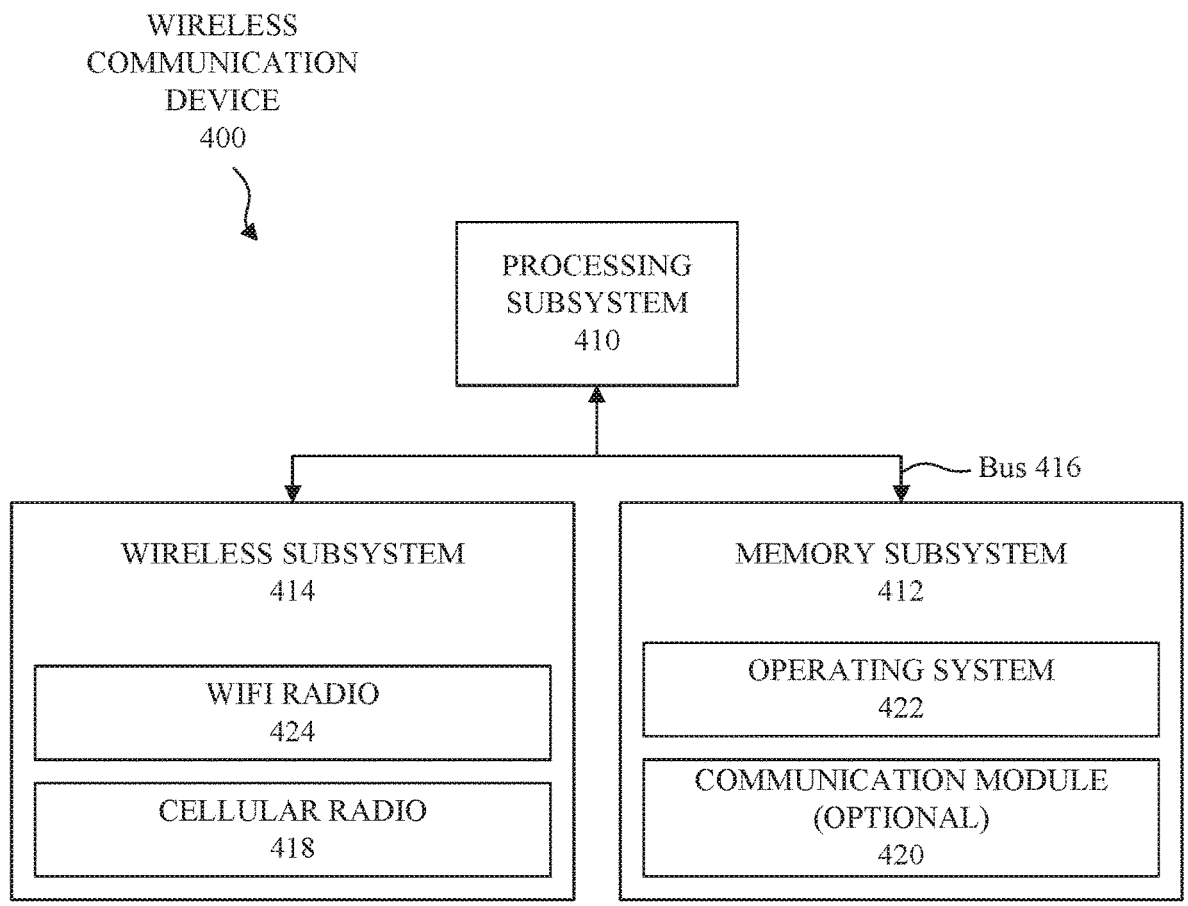
FIG. 4 illustrates a block diagram of a wirelessly-enabled device, according to some embodiments.

The internal components of wirelessly-enabled device 110 will now be described in further detail with references to FIG. 4. FIG. 4 illustrates a block diagram of a wirelessly-enabled device 400, according to some embodiments. Wirelessly-enabled device 400 may represent an exemplary embodiment of wirelessly-enabled device 110. Wirelessly-enabled device 400 may include a processing subsystem 410, a memory subsystem 412, and a wireless subsystem 414.

Processing subsystem 410 may include or operate with one or more devices or components that perform computational operations. For example, processing subsystem 410 can include one or more microprocessors, baseband processor, application processor, application-specific integrated circuits (ASICs), microcontrollers, and/or programmable-logic devices. Processing subsystem 410 may execute an operating system 422 (stored in memory subsystem 412) that includes procedures (or a set of instructions) for handling various basic system services for performing hardware-dependent tasks.

Memory subsystem 412 may include one or more devices for storing data and/or instructions for processing subsystem 410 and wireless subsystem 414. For example, memory subsystem 412 can include dynamic random access memory (DRAM), static random access memory (SRAM), and/or other types of memory. More generally, memory subsystem 412 may include volatile memory and/or non-volatile memory that are configured to store information. In addition, memory subsystem 412 can include mechanisms for controlling access to the memory. In some embodiments, memory subsystem 412 includes a memory hierarchy that comprises one or more caches coupled to a memory in wirelessly-enabled device 400. Additionally or alternatively, one or more of the caches may be located in processing subsystem 410.

Moreover, memory subsystem 412 may be coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by wirelessly-enabled device 400 as fast-access storage for often-used data, while the mass-storage device may be used to store less frequently used data.

Wireless subsystem 414 may include processors, controllers, radios/antennas, sockets/plugs, and/or other devices used for engaging in wireless communication with another wireless communication device, an access point, or a base station—e.g., communicating packets or frames, control signals, or beacons via a wireless communication link. As discussed previously, those skilled in the relevant art(s) will recognize that wirelessly-enabled device 400 may be configured to communicate using any one of Wi-Fi, Bluetooth, radio-frequency identification (RFID), near field communications (NFC), 60 GHz communications, cellular communication, or the like. Therefore, wireless subsystem 414 may be configured to enable communication with another wireless communication device, an access point, or a base station via any one of these wireless protocols. The mechanisms used for coupling to, communicating on, and handling data and events on the wireless link may be referred to collectively as an "interface" or "wireless interface" herein.

Within wirelessly-enabled device 400, processing subsystem 410, memory subsystem 412, and wireless subsystem 414 may be coupled together using bus 416. Bus 416 may be an electrical, optical, or electro-optical connection that the subsystems can use to communicate commands and data among one another. Although wirelessly-enabled device 400 is shown with only one bus 416, a different number or configuration of electrical, optical, or electro-optical connections among the subsystems is possible without departing from the spirit and scope of the present disclosure.

Similarly, wirelessly-enabled device 400 may be implemented as a standalone or a discrete device or may be incorporated within or coupled to another electrical device or host device, such as a cellphone, smartwatch, portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the present disclosure.

In an embodiment, wirelessly-enabled device 400 may include one or more additional processing subsystems 410, memory subsystems 412, and/or wireless subsystems 414. Additionally, it may be possible for one or more of these subsystems to be omitted from wirelessly-enabled device 400. Moreover, wirelessly-enabled device 400 may include one or more additional subsystems that are not shown in FIG. 4. For example, wirelessly-enabled device 400 can include, but is not limited to: a display subsystem for displaying information, a data collection subsystem, an audio and/or video subsystem, an alarm subsystem, a media processing subsystem, and/or an input/output (I/O) subsystem. Also, although separate subsystems are shown in FIG. 4, some or all of a given subsystem can be integrated into one or more of the other subsystems in wirelessly-enabled device 400 and/or positions of components in wirelessly-enabled device 400 can be changed without departing from the spirit and scope of the present invention.

Now turning back to wireless subsystem 414. As illustrated in FIG. 4, wireless subsystem 414 may include a Wi-Fi radio 424 and a cellular radio 418, which each may include hardware and/or software mechanisms that can be used for transmitting and receiving wireless signals to and from another wireless communication device, an access point, or a base station. In an embodiment, Wi-Fi radio 424 may be responsible for carrying out Wi-Fi communications, and cellular radio 418 may be responsible for carrying out cellular communications, embodiments of which were discussed above with respect to FIGS. 1-3. Additionally, cellular radio 418 may include both a cellular voice interface and a cellular data interface for transmitting and receiving voice and data traffic, respectively. Although wireless subsystem 414 is described as having only two radios, those skilled in the relevant art(s) will recognize that additional radios could also be included.

In an embodiment, wireless communication between wirelessly-enabled device 400 and other wirelessly-enabled devices may be implemented using low-level hardware, such as in a physical layer, a link layer and/or a network layer in a network architecture. For example, wireless communication may, at least in part, be implemented in a media access control layer. However, in other embodiments at least some of the wireless communication operations are performed by one or more programs, modules, or sets of instructions (such as optional communication module 420 stored in memory subsystem 412), which may be executed by processing subsystem 410. The one or more programs may constitute a computer-program mechanism. Furthermore, instructions in the various modules in memory subsystem 412 may be implemented in: a high-level procedural language, an object-oriented programming language, and/or in an assembly or machine language. Note that the programming language may be compiled or interpreted, e.g., configurable or configured, to be executed by processing subsystem 410.

As discussed above, wirelessly-enabled device 400 may represent an exemplary embodiment of wirelessly-enabled device 110. In such scenarios, processing subsystem 410 may be configured to perform at least the following functions associated with the fast return to Wi-Fi methods illustrated in FIGS. 2 and 3: interrupting an on-going Wi-Fi communication session; switching communication modes from Wi-Fi to cellular; preventing the cellular data interface from opening up; preventing data from being communicated over an open cellular data interface; bringing down the cellular voice interface; ending the cellular communication session; determining whether wirelessly-enabled device 400 has become disassociated with an access point; re-associating/creating an association with an available access point; bringing down the cellular data interface; opening the cellular data interface; and switching communication modes back from cellular to Wi-Fi.

Moreover, wireless subsystem 414 may be configured to perform at least the following functions associated with the fast return to Wi-Fi methods illustrated in FIGS. 2 and 3: establishing an initial Wi-Fi communication session; establishing a cellular voice communication session; scanning the wireless communication environment for an available access point; establishing a new Wi-Fi communication session; and establishing a data communication session using the cellular data interface.

The procedures (or set(s) of instructions) for performing the aforementioned functions may be included in operating system 422 stored in memory subsystem 412. Additionally, memory subsystem 412 may be configured to store various other forms of information that are used during the fast return to Wi-Fi methods illustrated in FIGS. 2 and 3, such as previous access point associations, IP addresses, and credentials for obtaining Wi-Fi connectivity through an access point, to provide some examples.

In an embodiment, a tangible, non-transitory apparatus or article of manufacture comprising a tangible computer useable or readable medium having control logic (software) stored thereon is also referred to herein as a computer program product or program storage device. This includes, but is not limited to, processing subsystem 410, memory subsystem 412, operating system 422, and communication module 420, as well as tangible articles of manufacture embodying any combination of the foregoing. Such control logic, when executed by one or more data processing devices (such as processing subsystem 410), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 4. In particular, embodiments may operate with software, hardware, and/or operating system implementations other than those described herein.

Additionally, embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

CONCLUSION

It is to be appreciated that the Detailed Description section, and not any other section, is intended to be used to interpret the claims. Other sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, in a wirelessly-enabled device, for switching between a first and a second wireless communication mode, comprising:
    initiating a first data communication session in accordance with the first wireless communication mode;
    interrupting the first data communication session, wherein the interrupting is caused by at least one of receiving or placing a voice call;
    initiating a voice communication session corresponding to the voice call in accordance with the second wireless communication mode, wherein the first data communication session and the voice communication session relate to different communication sessions;
    completing the voice communication session;
    determining, based on a disassociate message, that the wirelessly-enabled device has become disassociated with a first access point used to facilitate the first data communication session, wherein the disassociate message is received from the first access point, wherein the disassociate message is generated based on the voice communication session exceeding a time limit, and wherein the time limit is an amount of time sufficient to maintain at least a portion of the voice call;
    scanning, after determining that the wirelessly-enabled device has become disassociated with the first access point, a wireless communication environment for an available access point;
    attempting to associate with the available access point based on the scanning; and
    performing at least one of:
        initiating a second data communication session in accordance with the first wireless communication mode based on a successful association with the available access point; or
        initiating a third data communication session in accordance with the second wireless communication mode based on an unsuccessful association with the available access point.

2. The method of claim 1, wherein the wirelessly-enabled device is a smartwatch.

3. The method of claim 2, wherein the first wireless communication mode is a Wi-Fi communication mode, the second wireless communication mode is a cellular communication mode, and the Wi-Fi communication mode offers one or more of improved battery life, higher data speeds, or lower costs when compared to the cellular communication mode.

4. The method of claim 3, wherein the first and second data communication sessions are carried out over a Wi-Fi interface, and the third data communication session is carried out over a cellular data interface.

5. The method of claim 4, wherein the smartwatch does not support Wi-Fi calling.

6. The method of claim 5, wherein the interrupting the first data communication session is further caused by moving outside of a Wi-Fi coverage area associated with the first access point.

7. The method of claim 4, wherein the scanning is performed to facilitate a fast return to the Wi-Fi communication mode, wherein the scanning is performed prior to initiating the third data communication session in accordance with the cellular communication mode, and wherein the scanning is performed for a predetermined amount of time lasting between approximately one second to approximately 10 seconds.

8. The method of claim 4, wherein the first, second, and third data communication sessions do not take place concurrently.

9. The method of claim 4, further comprising:
    preventing the cellular data interface from opening during the voice communication session; and
    opening the cellular data interface after the scanning to facilitate the initiating the third data communication session.

10. The method of claim 4, further comprising:
opening the cellular data interface during the voice communication session;
preventing data from being communicated over the cellular data interface during the voice communication session; and
closing the cellular data interface after the scanning to facilitate the initiating the second data communication session.

11. The method of claim 4, wherein the determining is performed locally by the wirelessly-enabled device detecting that the Wi-Fi interface is down.

12. The method of claim 4, wherein the disassociate message indicates that the Wi-Fi interface has gone down.

13. The method of claim 4, further comprising querying the cellular data interface during the voice communication session to determine whether the voice call has been completed.

14. The method of claim 1, wherein the first data communication session is a non-voice communication session.

15. The method of claim 1, wherein the disassociate message is received from the first access point after an unsuccessful attempt by the first access point to transmit data in accordance with the first wireless communication mode during the voice communication session.

16. A method, within a wirelessly-enabled device, for performing a fast return to a Wi-Fi communication mode following a completion of a cellular voice call, comprising:
interrupting a first Wi-Fi data communication session, wherein the interrupting is caused by at least one of receiving or placing the cellular voice call;
initiating the cellular voice call using a cellular voice interface, included in the wirelessly-enabled device, wherein the first Wi-Fi data communication session and the cellular voice call relate to different communication sessions;
preventing a cellular data interface, included in the wirelessly-enabled device, from opening during the cellular voice call;
completing the cellular voice call;
determining, based on a disassociate message, that the wirelessly-enabled device has become disassociated with a first access point used to facilitate the first Wi-Fi data communication session, wherein the disassociate message is received from the first access point, wherein the disassociate message is generated based on a voice communication session exceeding a time limit, and wherein the time limit is an amount of time sufficient to maintain at least a portion of the cellular voice call;
attempting to associate with an available access point after determining that the wirelessly-enabled device has become disassociated with the first access point; and
initiating a second Wi-Fi data communication session based on a successful association with the available access point.

17. The method of claim 16, further comprising:
opening the cellular data interface after the completing the cellular voice call based on an unsuccessful association with the first access point; and
initiating a third data communication session using the cellular data interface.

18. The method of claim 16, wherein the wirelessly-enabled device is a smartwatch that does not support Wi-Fi calling.

19. The method of claim 18, wherein the cellular data interface is an internet Packet Data Network (PDN) interface.

20. The method of claim 19, wherein the preventing the cellular data interface from opening is performed by at least one of a baseband processor and an application processor included in the wirelessly-enabled device.

21. A method, in a wirelessly-enabled device, for performing a fast return to a Wi-Fi communication mode following a completion of a cellular voice call, comprising:
interrupting a first Wi-Fi data communication session, wherein the interrupting is caused by at least one of receiving or placing the cellular voice call;
initiating the cellular voice call using a cellular voice interface, included in the wirelessly-enabled device, wherein the first Wi-Fi data communication session and the cellular voice call relate to different communication sessions;
opening a cellular data interface included in the wirelessly-enabled device;
preventing data from being communicated over the cellular data interface during the cellular voice call;
determining, based on a disassociate message, that the wirelessly-enabled device has become disassociated with a first access point used to facilitate the first Wi-Fi data communication session, wherein the disassociate message is received from the first access point, wherein the disassociate message is generated based on a voice communication session exceeding a time limit and wherein the time limit is an amount of time sufficient to maintain at least a portion of the cellular voice call;
attempting to associate with an available access point after determining that the wirelessly-enabled device has become disassociated with the first access point;
closing the cellular data interface based on a successful association with the available access point; and
initiating a second Wi-Fi data communication session.

22. The method of claim 21, further comprising initiating a third data communication session using the cellular data interface based on an unsuccessful association with the first access point.

23. The method of claim 21, wherein the wirelessly-enabled device is a smartwatch that does not support Wi-Fi calling.

24. The method of claim 21, wherein the time limit is an amount of time sufficient to maintain at least a portion of the cellular voice call.

* * * * *